United States Patent [19]

Silvestrini

[11] 4,122,765
[45] * Oct. 31, 1978

[54] APPARATUS FOR PITTING FRUITS OR DRUPE TYPE

[75] Inventor: Jesus A. Silvestrini, Mendoza, Argentina

[73] Assignee: California Processing Machinery, San Ramon, Calif.

[ * ] Notice: The portion of the term of this patent subsequent to Aug. 29, 1995, has been disclaimed.

[21] Appl. No.: 822,669

[22] Filed: Aug. 8, 1977

Related U.S. Application Data

[63] Continuation-in-part of Ser. No. 639,706, Dec. 11, 1975.

[51] Int. Cl.² .............................................. A23N 4/22
[52] U.S. Cl. .......................................... 99/551; 99/554
[58] Field of Search ................. 99/548, 551, 552, 554, 99/562, 563

[56] References Cited

U.S. PATENT DOCUMENTS

| | | | |
|---|---|---|---|
| 17,726 | 7/1930 | Duncan | 99/551 |
| 2,826,227 | 3/1958 | Perelli | 99/551 |
| 3,003,529 | 10/1961 | Creed | 99/551 |

Primary Examiner—Harvey C. Hornsby
Assistant Examiner—Arthur O. Henderson
Attorney, Agent, or Firm—Limbach, Limbach & Sutton

[57] ABSTRACT

Drupe pitting apparatus includes means which receive such a fruit, produce a partial cut in its pulp and thus define two fruit halves adhered to the pit of the fruit and grips the pit, and means for gripping the outer surfaces of the two fruit halves. The gripping means includes a pair of opposed gripper heads which are movable toward and away from the fruit halves and each of which has a cavity facing the fruit with an elastic, cup-like diaphragm element extending within and continuously across the gripper head cavity for resiliently engaging and releasingly gripping the fruit half, means for supplying a pressurized operating fluid to the space between the gripper head cavity and the respective diaphragm element dial means for controlling the selective introduction and release of the pressurized fluid within those spaces, and means for rotating the gripping heads in opposite directions about an axis extending through the fruit while the diaphragm elements grip the fruit halves to free the fruit halves from one another and from the pit.

6 Claims, 10 Drawing Figures

4,122,765

APPARATUS FOR PITTING FRUITS OR DRUPE TYPE

RELATED APPLICATIONS

This application is a continuation-in-part of my copending application Ser. No. 639,706, filed Dec. 11, 1975, and entitled "Method and Apparatus for Pitting Peaches".

BACKGROUND OF THE INVENTION

In the canning industry there has long been a requirement for equipment for pitting fruits of the drupe type, such as peaches. To satisfy this requirement, there have been developed various types of equipment for performing such pitting operation with varying degrees of efficiency. However, most of this prior art pitting equipment has been relatively complex, cumbersome, expensive, and generally difficult to clean. Many of these problems have related to the fruit gripping heads and their mechanical operation, which in many prior art devices have promoted the entrapment of particles of the fruit within the heads, thus resulting in an unsanitary condition.

SUMMARY OF THE INVENTION

It is an object of the present invention to provide pitting apparatus for fruits of the drupe type which overcomes the disadvantages of the prior art pitting equipment. It is a further object of the invention to provide such apparatus which incorporates an improved means for gripping the fruit for the pitting operation. It is yet a further object of the invention to provide such apparatus in which the gripping means is protected by a flexible membrane which extends continuously across the portion of the gripper head which contacts the fruit, thus separating the fruit from the remainder of the gripper head by this membrane. These and other objects will become apparent from the following disclosure.

Briefly, this invention comprises apparatus for bisecting and pitting fruits of the drupe type, comprising means which receive such a fruit, produce a partial cut in its pulp and thus define two fruit halves adhered to the pit of the fruit and grip the pit, and gripping means including a pair of opposed gripper heads which grip the outer surfaces of the two fruit halves, and means for rotating the gripping heads in opposite directions about an axis extending through the fruit to free the fruit halves from one another and from the pit. The gripping means include the gripper heads, one each of which is disposed on opposite sides of the fruit receiving and cutting means and each generally adjacent a respective one of the fruit halves, with each such gripper head having a cavity facing the fruit receiving and cutting means, means for moving the gripper heads between a position distal the fruit receiving and cutting means and a position proximal the receiving and cutting means where the gripper heads substantially surround the respective adjacent fruit halves. Additionally, elastic cup-like diaphragm elements extend within and continuously across each such gripper head cavity for resiliently engaging and releasably gripping the outer surface of the respective fruit halves and prevent contact between the fruit and other portions of the gripper head within the cavity when the gripper heads are in their fruit half surrounding positions. Further included are means for supplying a pressurized operating fluid to the space between each gripper head cavity and its respective diaphragm element whereby the introduction of such pressurized fluid into such space will cause the diaphragm elements to be deformed so as to adapt those diaphragm elements to the shape of the respective fruit halves and thus grip those fruit halves. For controlling the selective introduction and release of the pressurized fluid within such spaces valve means are provided whereby such introduction and release of the pressurized fluid will effect selective gripping and release of the fruit by the gripping means.

BRIEF DESCRIPTION OF THE DRAWINGS

A particularly preferred embodiment of the apparatus of this invention will be disclosed in detail in which.

DESCRIPTION OF A PREFERRED EMBODIMENT

Figure 1:
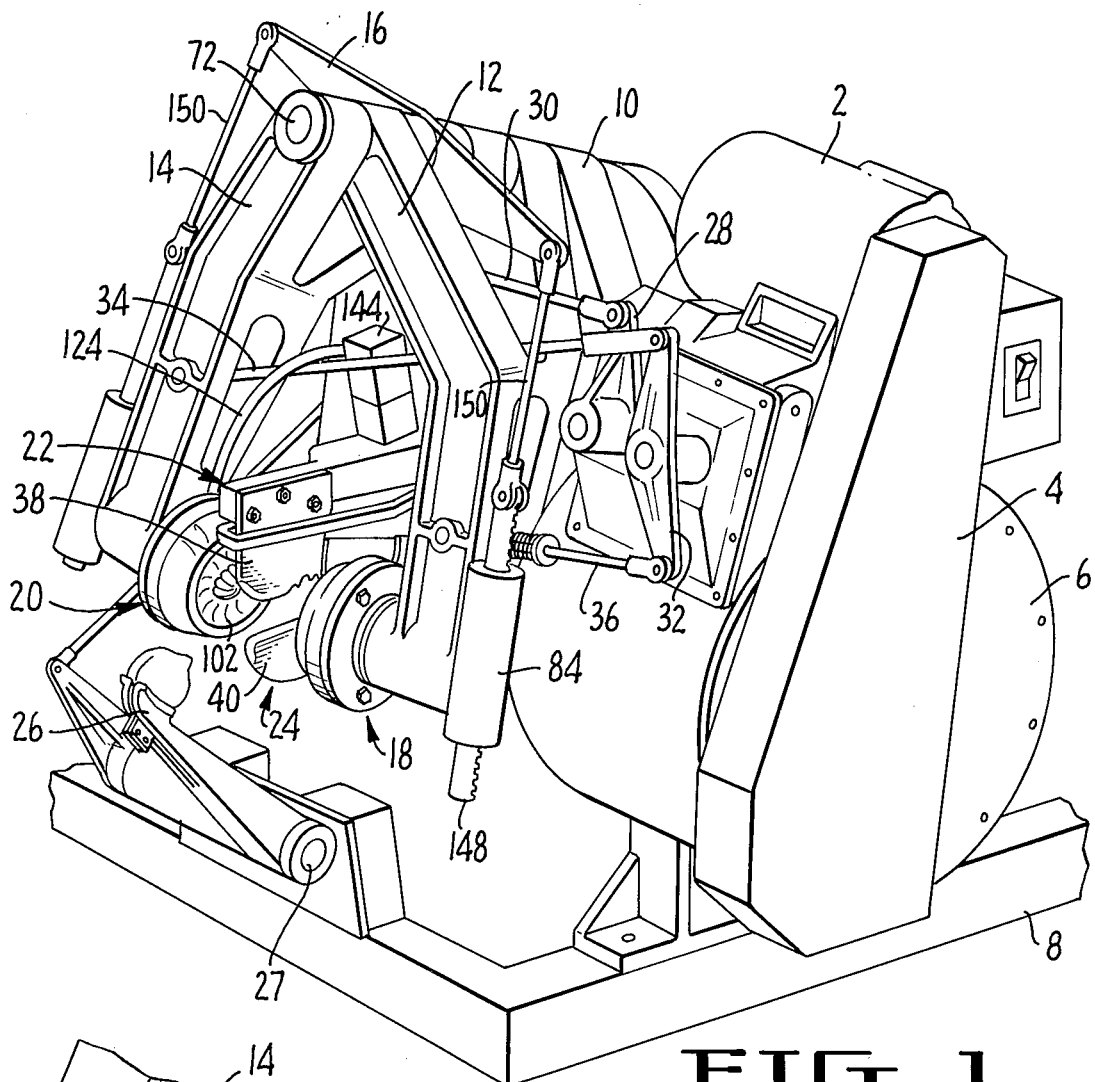
FIG. 1 is a front perspective view of the equipment of this invention with the gripper head assemblies in their open, fruit-receiving position.

A particularly preferred embodiment of the pitter of this invention is illustrated in FIGS. 1 through 8. This apparatus comprises, in general, a motor 2 which is connected by a belt 3, not shown but behind guard 4, to gear box and cam housing 6 in which various cams and gears are contained for providing the necessary mechanical action to the apparatus. The gear box and remainder of the pitter is mounted on a frame 8, a fragment of which is shown. Extending out from the upper portion of the gear box 6 is the support 10 to which are pivotally mounted the gripper head arms 12 and 14 and the gripper head rotating belt crank 16. Adjacent the lowermost extremities of each of these arms 12 and 14 are the respective gripper head assemblies generally indicated by the reference numerals 18 and 20. Disposed between the two gripper head assemblies 18 and 20 and mounted to the gear box 6 also is fixed upper jaw assembly 22 and movable lower jaw assembly 24. A cup feeder 26 is pivotally mounted by shaft 27 to the frame 8 for movement toward and away from the jaw assemblies 22 and 24. A crank arm 28 pivotally mounted to and driven by the gear box 6 is connected by a push rod 30 to a downwardly extending arm 52 of the bell crank 16. A bell crank 32 pivotally mounted to and driven by the gear box 6 is connected by an upper push rod 34 to pivotally mounted gripper head arm 14 and by lower push rod 36 to the other pivotally mounted gripper head arm 12.

Figure 2:
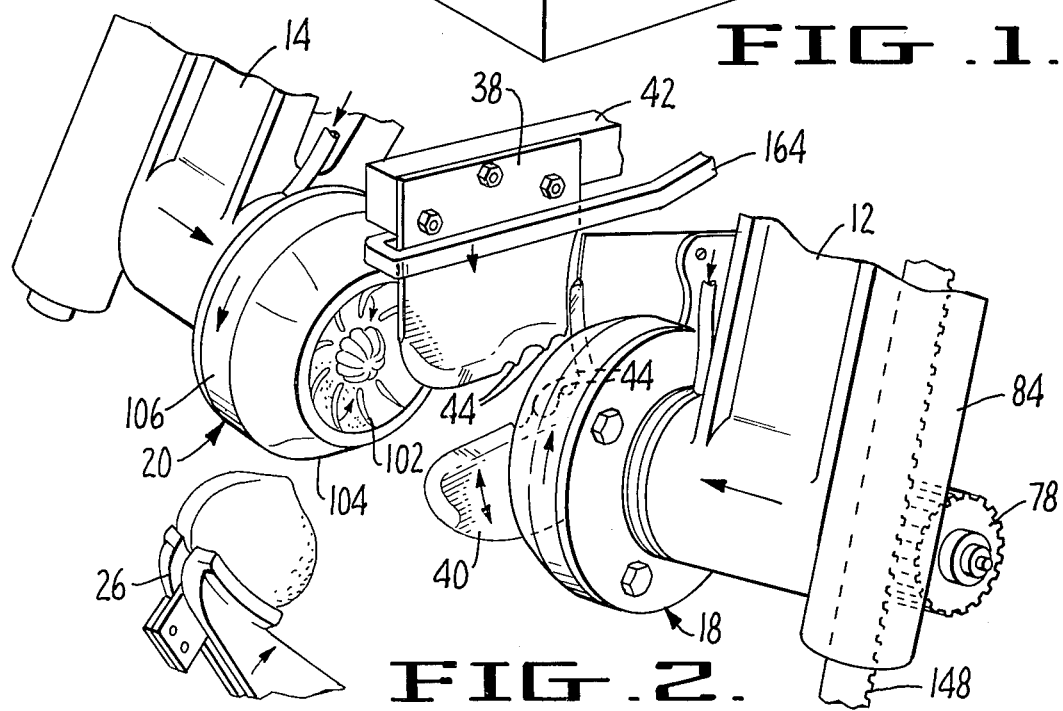
FIG. 2 is a fragmentary view on enlarged scale of the feeding, gripper head and cutter assemblies of the apparatus of FIG. 1.
Figure 3:
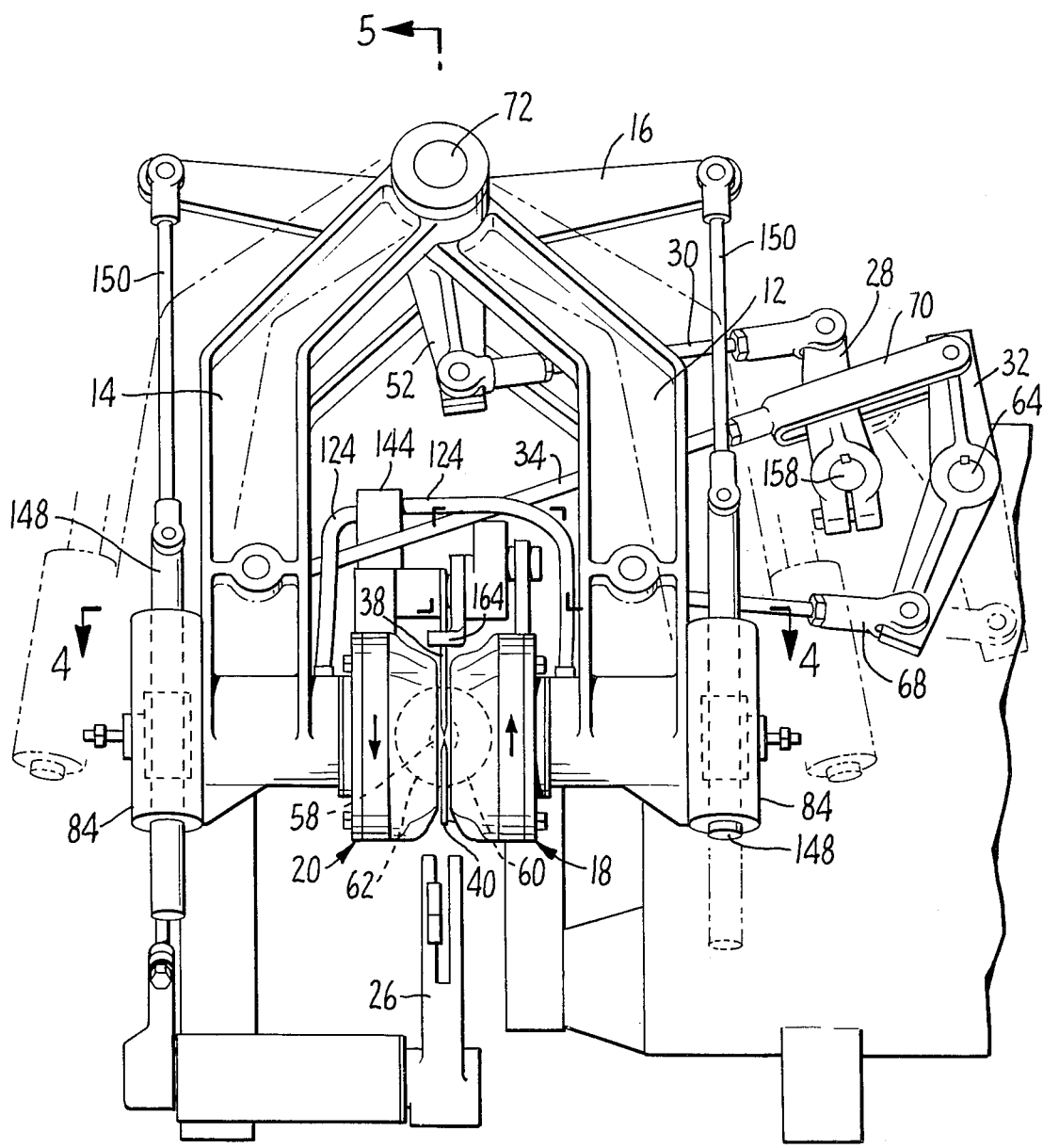
FIG. 3 is a front view of the apparatus of FIG. 1 with the gripper heads in their fruit-gripping position.
Figure 4:
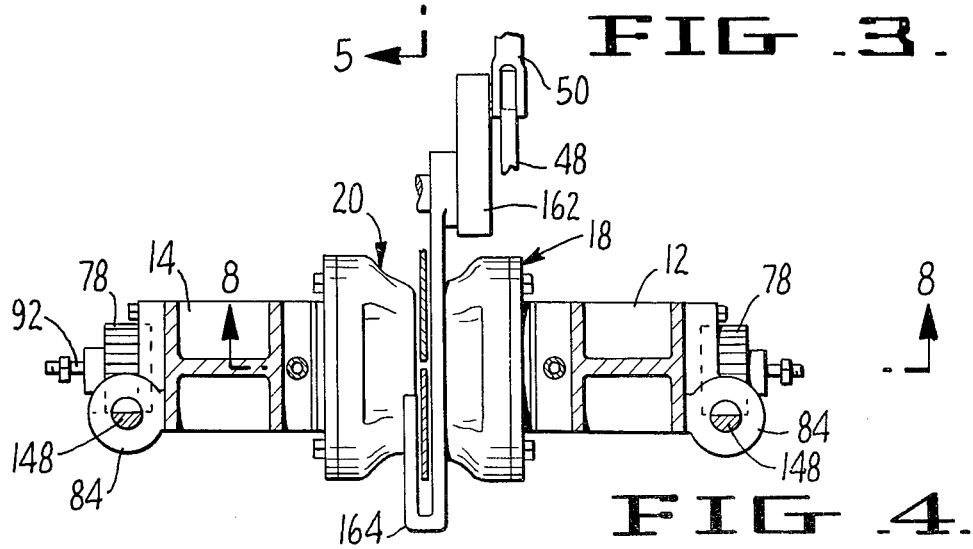
FIG. 4 is a top sectional view of the apparatus of FIG. 3, taken along line 4—4.

In FIG. 1, and in the enlarged fragmentary view of FIG. 2, the apparatus is illustrated with the cup feeder 26 moving toward the jaw assemblies 22 and 24 with a fruit of the drupe type, such as a peach, held within with the seam of the fruit aligned with the plane of the jaws 38 and 40. Jaw 38 is attached to the support arm 42 to form upper blade assembly 22. Lower jaw 40 is attached to a movable support to form lower jaw assembly 24, in a manner to be described below. Such jaws may be attached to the respective mountings by any suitable means, such as bolts.

In the illustrations of FIGS. 1 and 2, the upper and lower jaw assemblies 22 and 24 respectively, are illustrated in their normal fruit receiving position, with the jaws 38 and 40 spaced apart a distance suitably corresponding to or slightly larger than the size of the pit of the fruit being inserted thereinto. The edges of these jaws 38 and 40 which receive the fruit are sharpened, with a plurality of pit gripping teeth 44 being provided toward the rear of the jaws. Thus, as the fruit feeding arm 26 continues to pivot toward the jaw assemblies the fruit will be inserted onto and received by the cutting surfaces of the upper and lower jaws 38 and 40, with those jaws producing a partial cut in the pulp of the fruit and with the feeder 26 forcing the fruit to the rear of the opening between the jaws until the pit engages the upright rear portion of the lower blade and stops further insertion. It may be noted, in FIG. 3, that the feeding arm 26 is provided with a slot so that the arm may straddle the jaws 38 and 40 as it inserts the fruit into the gap between the jaws.

With the apparatus in the condition illustrated in FIGS. 1 and 2 the gripper head assemblies 18 and 20, mounted on their respective arms 12 and 14, are shown positioned distal the jaw assemblies so that a fruit may be inserted between them.

Figure 5:
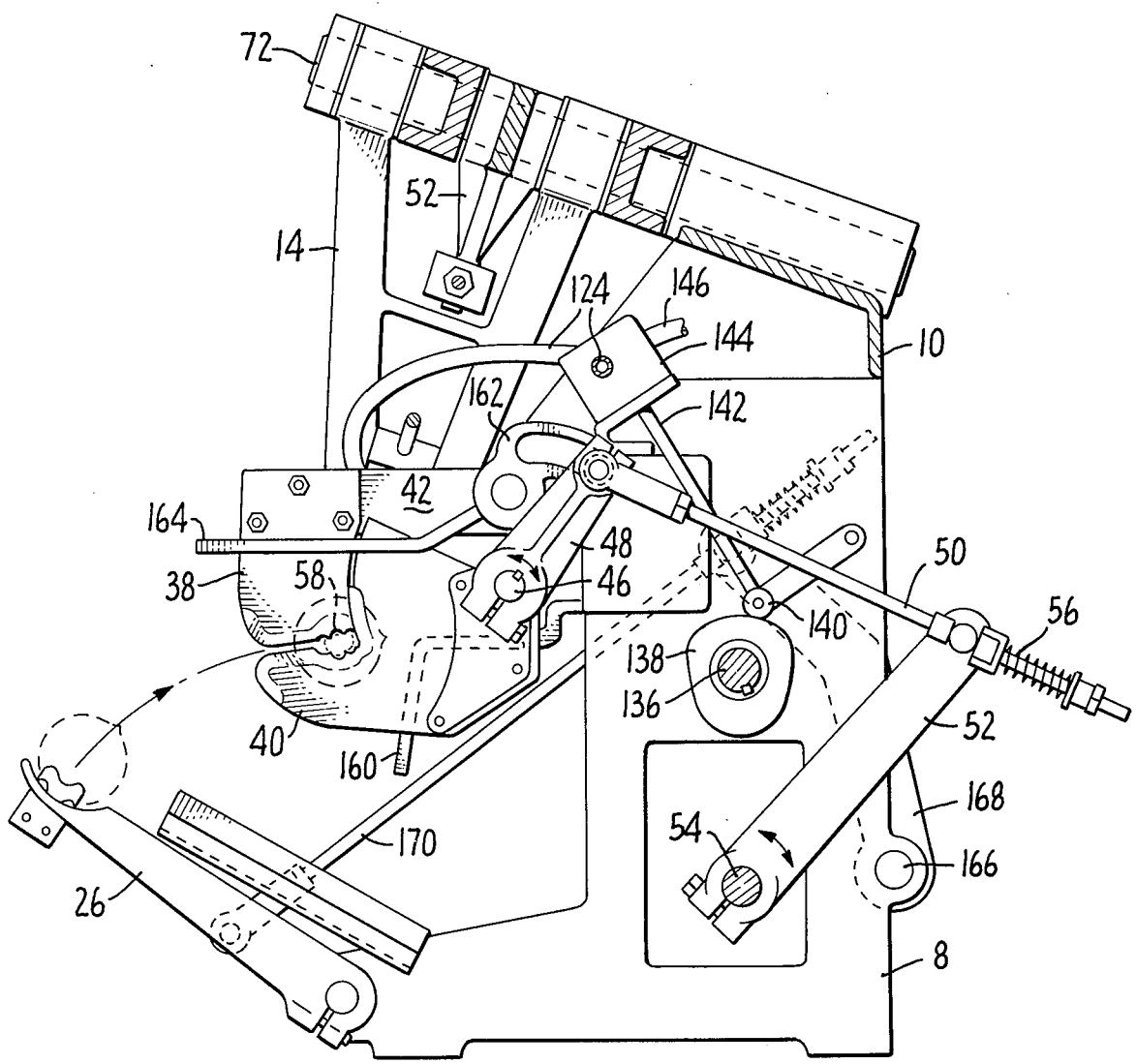
FIG. 5 is a side sectional view taken along line 5—5 of FIG. 3.

When the fruit has been fully inserted into the space between the upper and lower jaws 38 and 40, the lower jaw 40 is pivoted toward the upper blade 38 until the teeth 44 on the blade engage and grip the pit of the fruit, as illustrated in FIG. 5. This pivoting of lower jaw 40 is done about the pivotal mounting point 46 of that lower jaw and is effected by the clockwise movement of crank arm 48. Crank arm 48 is, in turn, actuated by the movement of push rod 50 under the action of crank arm 52 which itself is pivoted counterclockwise by shaft 54, which is driven from the gear and cam assembly 6 in a manner to be described below. It may be noted that, in closing lower jaw 40, the arm 52 acts against a compression spring 56, thus closing lower jaw 40 against a resilient biasing force to allow for gripping of pits 58 of difference sizes with a relatively constant force.

When the upper and lower jaws 38 and 40 have closed and thus grip the pit 58 of the fruit, the sharpened edges of the jaws have necessarily also at least partially cut through the pulp of the fruit generally along the center line of the fruit, thus defining two fruit halves 60 and 62 which are adhered to the pit.

Upon the closing of the jaws, driven by the gear and cam arrangement inside housing 6, that same gear and cam system, which will be described below, then effects a counterclockwise rotation of shaft 64 and thus bell crank 32 attached thereto. This rotation moves the bell crank 32 from the broken line position of FIG. 3 to the solid line position. The movement of bell crank 32 is thus transmitted through push rod assemblies 68 and 70 to pivot the respective arms 12 and 14 about frame mounted pivot 72 from the position illustrated in FIGS. 1 and 2 and shown in the broken line representation of FIG. 3, to the position illustrated in the solid line representation of FIG. 3. This pivotal movement of the arms 12 and 14 thus brings the opposed gripper heads 18 and 20 from a location distal the upper and lower jaws to a position proximal those jaws so that the gripper heads 18 and 20 substantially surround the respectively adjacent fruit halves 60 and 62 for gripping those fruit halves.

Figure 7:
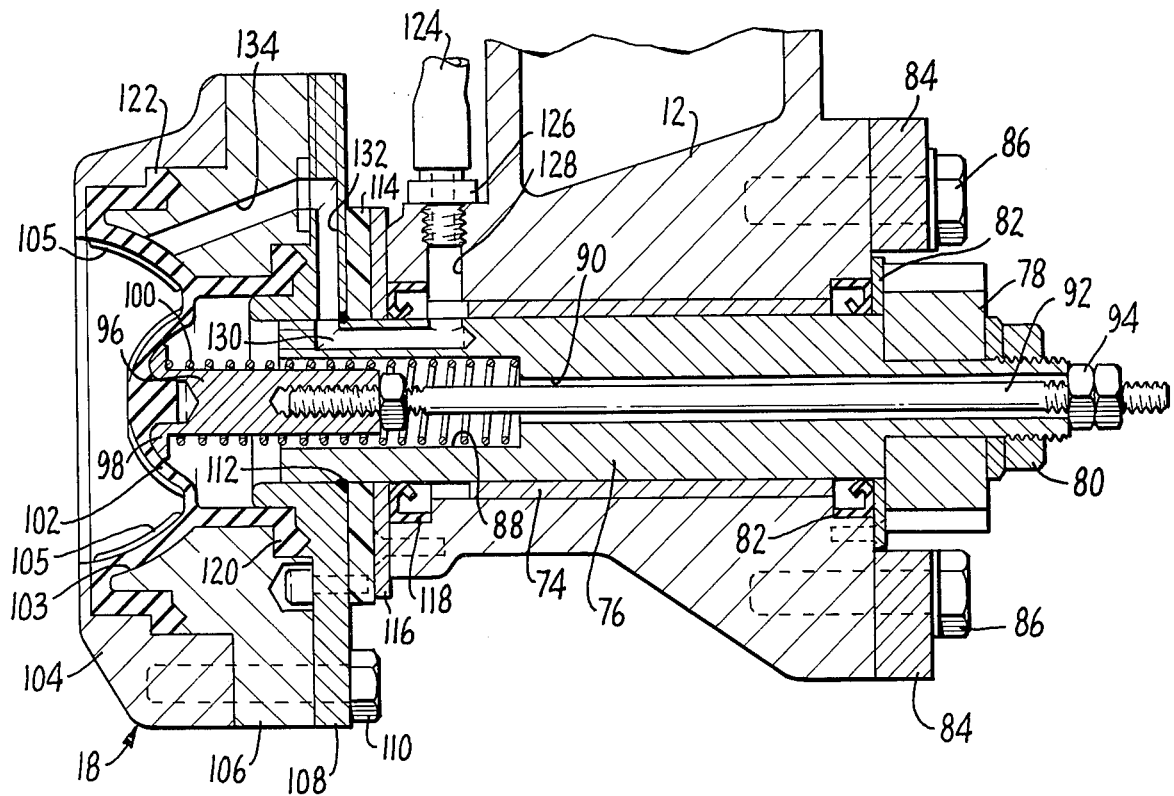
FIG. 7 is a fragmentary sectional view of one of the gripper head assemblies of the apparatus of FIG. 1, at an enlarged scale taken along the center line of such assembly.
Figure 8:
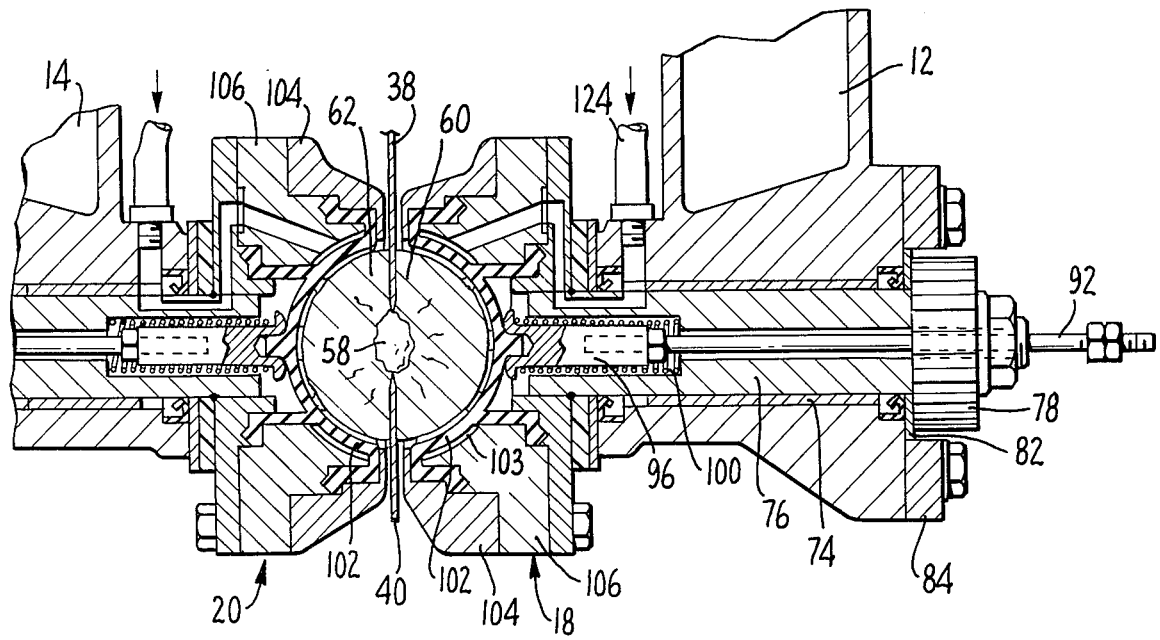
FIG. 8 is a side elevational view at an enlarged scale taken along line 8—8 of FIG. 4.

The manner in which the fruit halves are gripped by the gripper head assemblies may be explained best with reference to FIGS. 7 and 8, which represent cross-sectional views of the gripper head assemblies 18 and 20 which are located at the extremities of the pivot arms 12 and 14. In the section of FIG. 7 the gripper head 18 is shown in the configuration it would have prior to the pivoting of the arms 12 and 14 to their fruit engaging position, such as in the case of FIGS. 1 and 2. Only arm 12 and gripper head assembly 18 are illustrated, it being understood that arm 14 and gripper head assembly 20 are substantially mirror images thereof.

Adjacent the lower extremity of arm 12 there is provided a circular bore into which sleeve bushing 74 is inserted, suitably by pressing. Within that bushing 74 the gripper head shaft 76 is rotatably inserted. Adjacent the end of shaft 76 opposite from the fruit gripping structure a gear pinion 78 is rigidly and nonrotatably affixed to shaft 76 by conventional means, such as a threaded retainer 80. Between pinion 78 and the extremity of arm 12 is positioned a thrust washer 82 to reduce friction during any relative rotation between the pinion 78 (and thus the shaft 76) and the arm 12. Within a circumferential recess about the bore in arm 12 immediately adjacent the thrust washer 82 a seal is provided in arm 12, bearing against both thrust washer 82 and the shaft 76 to seal against fluid leaks between the shaft 76 and the arm 12, as will be described below. A portion of the rack housing 84, discussed below, is illustrated in FIG. 7 attached to the arm 12 by conventional means, such as cap screws 86.

The opposite end of shaft 76, which projects longitudinally outwardly of the bore through arm 12, is provided with a counterbore 88 of predetermined depth, which is coaxial with the center line of shaft 76. Extending between the innermost end of this counterbore 88 and the end of shaft 76 adjacent the pinion 78, there is provided an additional bore 90, smaller in diameter but coaxial with counterbore 88. Extending through bore 90 and projecting beyond the ends thereof is shaft 92, which is provided with stopping means, suitably in the form of lock nuts 94, to restrain its movement longitudinally of the bore 90 toward the counterbore 88. At its opposite end, shaft 92 is threaded into a plug or plunger 96, which has an enlarged head 98 at its extremity longitudinally distal the shaft 92. A compression spring 100 is fitted around the plug 96, bearing at one end against the enlarged head 98 and at its opposite end against the innermost end of counterbore 88, thus urging the plug, and the shaft 92, in a direction along the axis of shaft 76 and away from the pinion 78, urging the shaft to the left in FIG. 7. Restraining the longitudinal movement of plug 96 in the direction toward the fruit grouping and cutting jaws, to the left in FIG. 7, is gripper cup 102, which is in the form of an elastic, cup-like diaphragm element, suitably of a rubberlike material, which extends continuously across and within a cavity 103 formed in the outwardly facing portion of the gripper head. This gripper head is fabricated of a suitable material, conveniently bronze or other metal and comprises two generally circular members 104 and 106. These members 104 and 106 are attached to a ring-like member 108 by suitable means such as cap screws 110. The ring 108 is affixed by suitable means, conveniently a continuous welding bead 112, to the shaft 76. Thus, the gripper head comprised of elements 104 and 106 is itself affixed to shaft 76. A friction reducing ring 114 of suitable material, such as synthetic resin, is attached to the side of ring 108 distal the gripper head elements and, itself, engages thrust bearing ring 116 which is affixed by suitable means to the arm 12, with relative rotary motion provided about the center line of shaft 76 between the thrust element 114 and the ring 116. A seal 118 is inserted into an annular bore in arm 12 adjacent the thrust element 116 and bearing against the shaft 76, for purposes to be described below.

As best illustrated in FIG. 7, the resilient, cup-like diaphragm element 102 is restained within the cavity in the gripper head by the clamping engagement of flange 120 of the element between the ring 108 and the gripper head member 106 and by the clamping engagement of the flange 122 between gripper head members 104 and 106. Thus, this diaphragm element 102 is clamped against any relative motion or fluid leakage between members 104 and 106 and between member 106 and ring 108. The purpose of this sealing arrangement, plus the rotary seals 82 and 118, is illustrated in the combination of FIGS. 7 and 8. A conduit 124 for a pressurized fluid, such as air, is attached to a nipple 126 threaded into arm 12. From the inner end of nipple 126 a passage 128 extends into communication with the adjacent portion of shaft 76. Within shaft 76 is provided a passage 130 which, in a predetermined rotary position of shaft 76, aligns with passage 128. This passage 130 is, itself, aligned with passage 132 extending radially outward a predetermined distance in ring 108. This passage 132 in turn communicates with passage 134 which extends from the ring 108 through gripper head member 106 to communicate with the cavity 103 formed in the gripper head. Thus, this passage 134 may introduce the pressurized fluid from conduit 124 into the cavity across which the elastic diaphragm element 102 extends. The rotary seals 82 and 118 provide for relative rotary movement of shaft 76 while resisting leakage of the pressurized fluid past that shaft.

In FIG. 8 is illustrated the manner of operation and cooperation between the gripper assemblies 18 and 20 and the fruit held by upper and lower cutting jaws 38 and 40. As noted above, the two gripper head assemblies 18 and 20 are substantially mirror images of one another and incorporate substantialy identical components. Accordingly, the same reference numbers will be used with respect to both gripper head assemblies. In this configuration, the arms 12 and 14 have been pivoted toward one another such that the gripper heads 18 and 20 are in their closed positions substantially surrounding their respective fruit halves 60 and 62. As previously described, the various pivoting and rotating actions are controlled by the driven output of the gear and cam housing. By the synchronization of this cam and gear structure, illustrated and described below with respect to FIG. 10, when the gripper head assemblies 18 and 20 have closed to grip the fruit, as in FIG. 8, the output from gear and cam housing 6 rotatably drives shaft 136 (shown in FIG. 5) and thus cam 138. In synchronism with the closing of the gripper head assemblies around the fruit, the cam 138 actuates cam follower 140 and thus push rod 142 to open the push rod operated valve 144. The input 146 to this valve is from a suitable source of compressed fluid, such as compressed air, with the output being to conduits 124 which extend to the nipple 136 adjacent the gripper head assemblies. Thus, compressed fluid is introduced through the passages 128, 130, 132, and 134 into the cavity 103, where the pressure elastically deforms the cup-like membrane 102 toward the fruit to bring the membrane and particularly its generally radially extending ribs 105 into firm gripping contact with their respective fruit halves. It may also be noted from FIG. 8 that, upon the closing of the gripper head assemblies about the fruit, the central portion of the membrane 102, shown in FIG. 7 as projecting outwardly of the cavity 103, is deflected by its engagement with the fruit inwardly toward the position shown in FIG. 8. This deflection of the central portion of the membrane 102 also urges the plug 96 longitudinally away from the fruit against the force of the compression spring 100, pushing rod 92 in the same direction. The purpose of this deflection of the plug 96 will be described below.

From the illustration of FIG. 8 may be seen one of the particular advantages of the fruit pitting apparatus of this invention. Specifically, it may be noted that the cup-like diaphragm 102, by extending within and continuously across the gripper head cavity 103, seals the remainder of the gripper head assembly from the fruit and causes the fruit to be contacted only by that membrane 102. Thus, the juice, pulp and other portions of the fruit are largely kept away from contact with other portions of the gripper head assembly to avoid soiling it. Similarly, no portion of the gripper head other than the continuous and easily cleanable and, if desired, replaceable, membrane 102 contact the fruit, thus preventing its contamination by other portions of the gripper head assemblies.

With the pulp of the fruit cup and the pit gripped by the jaws 38 and 40 and the peach halves 60 and 62 gripped by their respectively adjacent gripper head assemblies, the fruit halves are then ready for separation from one another and from the pit 58. This is achieved by rotating the gripper head assemblies in a manner to be described below.

As previously noted with respect to FIG. 7, at the ends of shafts 76 opposite the gripper head assemblies pinions 78 are rigidly affixed to the shafts 76, such that rotation of the pinion will effect a rotation of the shaft 76 within the bushings 74. As illustrated in FIGS. 1 through 4, the rack housings 84 each provide for movement of a rack 148 in a direction transverse to the axis of and in engaging cooperation with pinions 78. Thus, movement of the racks 148 will effect rotation of the pinions 78 and thus of the shafts 76 to which they are attached and thus also of the gripper head assemblies including the gripper head members 104 and 106 and the membranes 102. Each of these racks 148 is attached at its upper end to a push rod 150 which, in turn, is attached to bell crank 16 which is pivotally mounted to the frame 110 through shaft 72. This bell crank 16 is connected in turn through push rod 30 to crank 28 which is mounted upon shaft 158 from the gear and cam housing 6, such shaft 158 being driven by the gear and cam arrangements described below. Upon gripping of the fruit halves by the cup-like membranes 102, the cam timing then provides for a limited clockwise rotation of the shaft 158 and thus of crank arm 156, thus causing the bell crank 16 to pivot in a counterclockwise direction. The pivoting of bell crank 16 thus pushes on the push rod 150 on the left of FIG. 3 and pulls on the push rod 150 on the right, thus moving the push rods from their broken line position to the solid line position illustrated. Since the push rods 150 are connected to the racks 148 which engage the pinions 78, this movement of the bell crank 16 thus rotates the gripper heads 18 and 20 in opposite directions, as indicated by the arrows on FIG. 3. This rotation effects the separation of the two peach halves from one another and from the pit in the well known manner.

Once the peach halves 60 and 62 have been separated from one another and from the pit, it is desirable then to release the fruit halves and the pit to prepare for another fruit and another pitting cycle. Again under the control of the driven cam and gear assembly, when the pitting heads have completed their predetermined amount of rotation, the rotation of shaft 136 and cam 138 then causes the actuating arm 142 to shift the valve 144 from its air pressure introducing configuration to its exhaust configuration, thus releasing the air pressure causing the membranes 102 to grip the fruit halves. Generally contemporaneously with that release of air pressure the shaft 64 and thus bell crank 32 is pivoted counterclockwise back to its original position, thus pivoting open the arms 12 and 14, away from the jaws 38 and 40 and back to the configuration of FIG. 1.

Since, upon the pivoting open of the arms 12 and 14, there is nothing retaining the fruit halves within the gripper head assemblies, the spring biased plug 96 urges the center of the membrane 102 outwardly, toward the configuration of FIG. 7, thus effectively ejecting the fruit from the gripper head assembly. Shortly after fruit halves have been released from the gripper heads, the shaft 158 and thus crank arm 156 pivot in a counterclockwise direction back to their original positions, thus moving the racks 148 back to their original positions and thus "unwinding" the rotatable gripper heads for another cycle and again aligning fluid passages 128 and 130. Also at the time of the release of the fruit halves the shaft 54 shown in FIG. 5 is rotated counterclockwise back to its original position thus driving the shaft 46 and thus the lower blade 40 in a similar counterclockwise direction, pivoting lower blade 40 away from fixed upper blade 38. This pivoting or opening of the lower jaw 40 thus releases the pit 58 to allow it also to fall free of the pitter.

Figure 6:
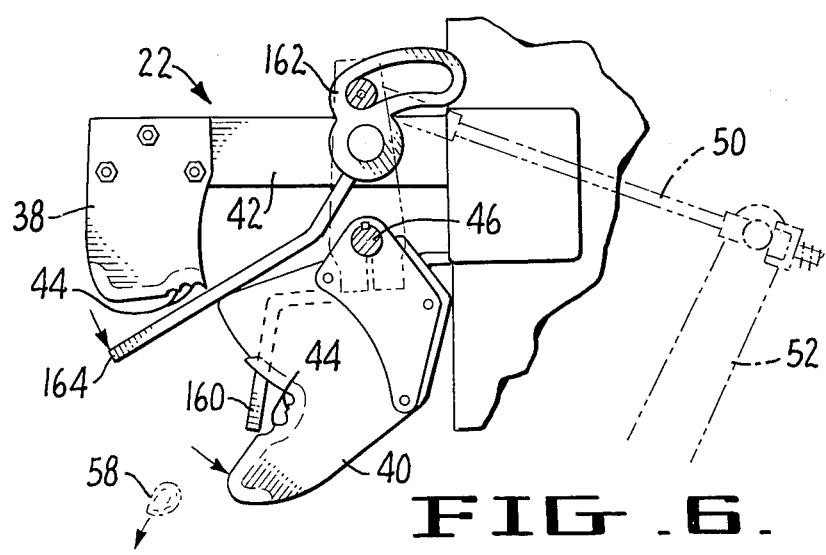
FIG. 6 is a fragmentary side view of the fruit receiving and cutting jaws of the apparatus of FIG. 5 with such jaws depicted in their open position and the pit removing means illustrated in its extended position.

On some occasions the pit 58 may be imbedded in either the upper or the lower jaw such that it does not fall free upon opening of the lower jaw 40. In this case it is necessary to knock the pit loose upon the opening of the jaws. This function is illustrated best in FIG. 6. Upon its downward pivoting during opening, the lower jaw 40 passes adjacent a fixed arm 160 mounted adjacent that lower blade. This arm is mounted sufficiently close to the blade that it effectively "scrapes off" and knocks free any pit imbedded in the teeth 44 of the lower blade. Additionally, the counterclockwise rotation of shaft 54 and thus arm 52 moves the push rod 50 generally to the left in FIGS. 5 and 6. As indicated in FIG. 6, the end of this push rod 50 comprises a cam follower riding in the slot of the cam 162 which is pivotally mounted to upper jaw support 42. This cam 162 also has attached to it the movable arm 164 which extends adjacent and closely alongside the fixed upper jaw 38, suitably extending along one side of the upper jaw, looping around the front of it and extending back along the other side of the jaw. Thus, when the push rod reaches the extremity of its travel to the left of FIG. 6, it moves the arm 164 down alongside the upper jaw 38, thus knocking loose any pit 58 that may be stuck to the teeth 44 of that jaw. By the suitable configuration of the cam 162, in the well known manner, the pivoting motion of the arm 164 down and back to its retracted position and also the wide open extension of lower jaw 44 may be effected very quickly, then retracting the arm 164 and bringing the lower jaw 40 back to the position illustrated in FIG. 1 ready to receive another fruit for pitting. At this point, when another fruit has been placed in arm 26, the pivoting of 166 under the drive from the gear and cam housing 6 and thus the pivoting of arm 168 moves the arm 170 which is connected to the pivotally mounted arm 26 and thus brings another fruit into the opening between the upper and lower jaws.

Figure 9:
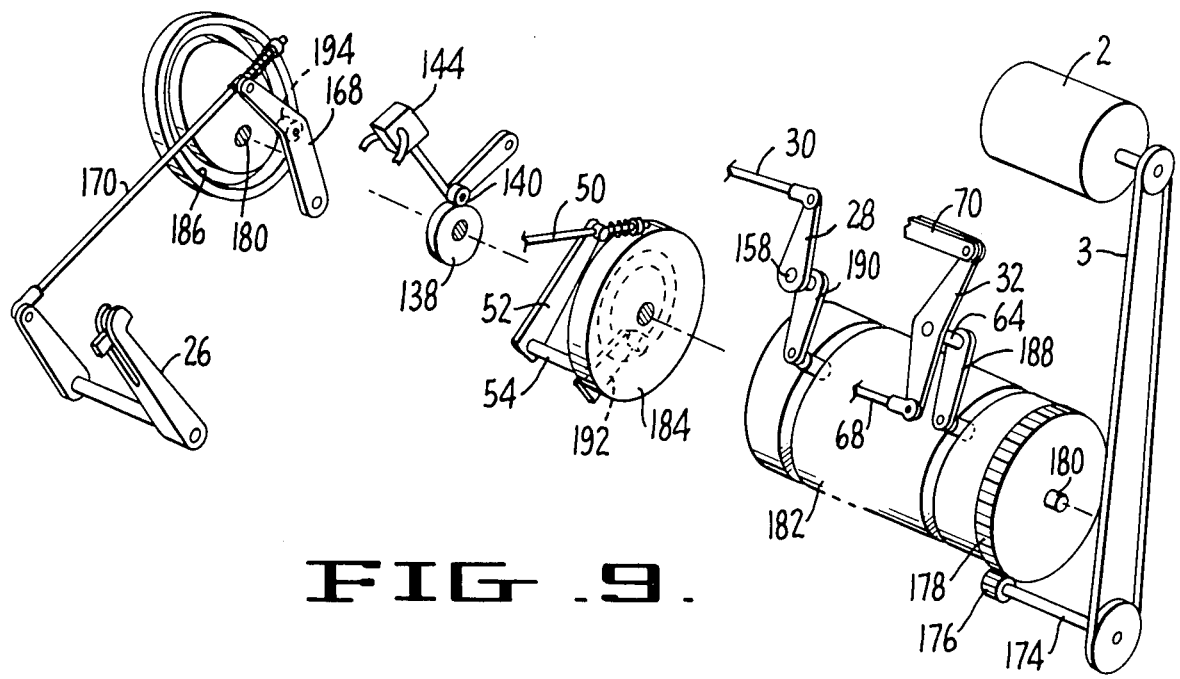
FIG. 9 is a schematic illustration of the cam and follower driving arrangements actuating the various elements of the apparatus of FIG. 1.
Figure 10:
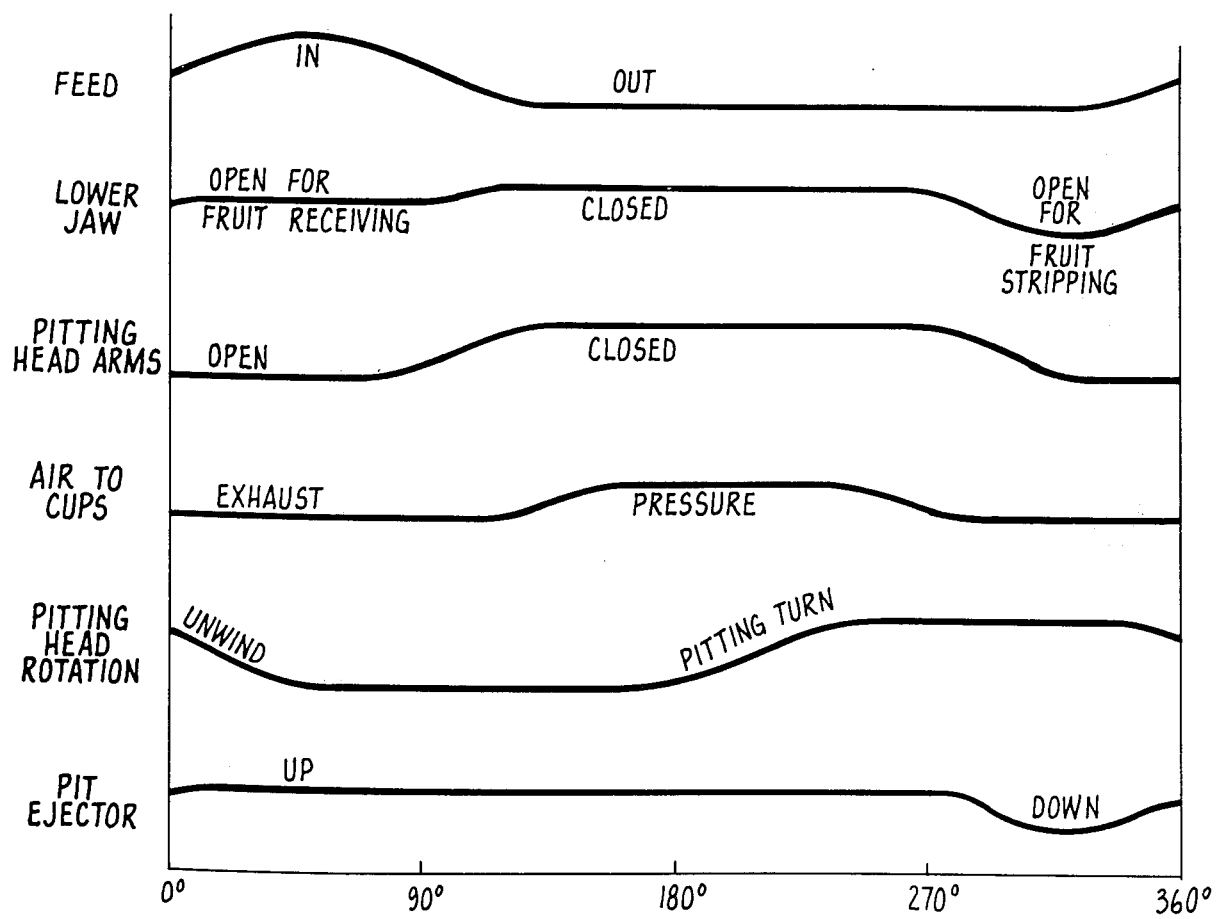
FIG. 10 is a timing diagram illustrating the sequence of operation of the various elements driven by the cams of FIG. 9.

The complete drive arrangement for the pitter of this invention is depicted in the schematic diagram of FIG. 9 with the cam timing illustrated in the chart of FIG. 10. The motor 2 drives, through belt 3, the pulley and shaft 174, at the end of which is mounted pinion 176. This pinion 176 in turn engages gear 178 which is mounted on the shaft 180 to which are attached cam drum 182 and cams 184, 138 and 186. A cam follower and arm 188 attached to shaft 64 engages an appropriate cam groove and drum 182 and thus provides for the driving movement of shaft 64 and thus bell crank 32, to control the opening and closing of the arms 12 and 14. Similarly, a cam follower and arm 190 are attached to shaft 158 and follow an appropriate cam groove and drum 182 to provide the necessary driving movement to arm 156, thus to move the racks 148 to cause the desired rotation of the gripper heads. In the cam groove of cam 184 a cam follower and arm 192, which are mounted to shaft 54, ride to provide the desired reciprocating motion for arm 52 and thus to the lower jaw 40 and the pit removing arm 164. As previously noted, cam 138 controls the introduction and exhaust of compressed fluid into the cavity behind the elastic membranes 102 for gripping the fruit. Cam 186 provides the movement to the feed arm 26 by its cooperation with cam follower 194, which is attached to arm 168. Since all of these cams are ultimately driven by motor 2 through shaft 180, it is apparent that synchronization, once achieved, will be maintained.

FIG. 10 illustrates the sequence of events as controlled by the cam structure. Initially, the feed arm moves briefly in to insert a fruit into the pitter and then withdraws. At that time, the lower jaw is maintained in an open position spaced slightly from the upper jaw. Similarly, at that time, the pitting head arms 12 and 14 are in their open positions spaced apart from one another and the valve 144 is open to exhaust any air that might otherwise deform the membranes 102. At this time, with the gripper head assemblies spaced away from the fruit, the racks are moved to "unwind" the pitting heads and the pit ejecting arm 164 is raised away from its pit ejecting position. Subsequently, after the fruit has been inserted into the jaws, the lower jaw is pivoted to a closed position to grip the pit and to cut the pulp. At that time also the pitting head arms 12 and 14 are pivoted to the closed position with the gripper head substantially surrounding the fruit. At that point, the valve 144 is actuated to introduce air pressure behind the membranes or cups 102 to grip the fruit. With the fruit gripped the cams then effect the pitting turn or rotation of the gripping heads to separate the fruit halves from one another and from the pit. Upon completion of the pitting turn the air pressure causing the cups to grip the fruit is again exhausted to release the grip on the fruit halves. With the grip released, the pitting head arms and the lower jaw are pivoted open to release the fruit halves and the pit, and the pit ejector arm is brought down to knock loose any pits that might be stuck to the fixed upper jaw. At this point the cycle is completed and a new cycle is ready to begin.

While the foregoing describes in detail one particularly preferred embodiment of the fruit pitting apparatus of the present invention, this description is to be considered only as illustrative of the principles of the invention and is not to be considered limitative thereof. Accordingly, since numerous modifications and variations, all within the scope of the present invention, will readily occur to those skilled in the art, the scope of the present invention is to be defined solely by the claims appended hereto.

What is claimed is:

1. Apparatus for bisecting and pitting fruits of the drupe type, comprising
   means for receiving such a fruit, producing a partial cut in its pulp and thus defining two fruit halves adhered to the pit of said fruit, and gripping said pit,
   means for gripping the outer surfaces of said two fruit halves, said gripping means comprising
      a pair of opposed gripper heads, one each disposed on opposite sides of said fruit receiving and cutting means and each generally adjacent a respective one of said fruit halves, each said gripper head having a cavity facing said fruit receiving and cutting means,
      means for moving said gripper heads between a position distal said fruit receiving and cutting means and a position proximal said fruit receiving and cutting means in which said gripper heads substantially surround their respectively adjacent said fruit halves,
      an elastic, cup-like diaphragm element extending within and continuously across each said gripper head cavity for resiliently engaging and releasably gripping the outer surface of the respective said fruit halves and preventing contact between said fruit and other portions of said gripper head within said cavity when said gripper heads are in their fruit half surrounding positions,
      means for supplying a pressurized operating fluid into the spaces between each said gripper head cavity and its respective diaphragm element, whereby the introduction of such pressurized fluid into the spaces between such cavities and diaphragm elements will cause the diaphragm elements to be elastically deformed so as to adapt those diaphragm elements to the shape of the respective fruit halves and thus grip those fruit halves,
      valve means for controlling selective introduction and release of said pressurized fluid within said spaces, whereby such introduction and release of such pressurized fluid will effect selective gripping and release of the fruit by the gripping means, and
   means for rotating said gripping heads in opposite directions about an axis extending through said fruit while said diaphragm elements grip said fruit halves, whereby the fruit halves may be freed from one another and from the pit.

2. Apparatus according to claim 1 wherein each said gripper head further includes means for ejecting said fruit halves after their release from said diaphragm element.

3. Apparatus according to claim 2 wherein said ejecting means comprises a resiliently biased element urging at least a portion of said diaphragm element outwardly of said cavity.

4. Apparatus according to claim 3 wherein said resiliently biased element comprises a plunger acting against the side of said diaphragm element opposite the side engaging said fruit, whereby the plunger acts against the diaphragm element and is prevented from contacting the fruit.

5. Apparatus according to claim 1 wherein said fruit receiving and cutting means comprises a pair of cutting and pit gripping jaws, one of said jaws being fixed and the other being movable generally toward and away from said fixed jaw to define an aperture of variable size between said jaws, into which aperture said pit can be inserted and releasably gripped.

6. Apparatus according to claim 5 further comprising means for removing said pit from said jaws after said fruit halves have been removed and the grip of said jaws has been released, said pit removing means comprising
   a movable arm mounted adjacent and extending closely alongside said fixed jaw and movable after release of the grip of said jaws between a normally retracted position remote from said jaw aperture and an extended position alongside said aperture,
   means for moving said movable arm between said retracted position and said extended position and back to said retracted position when said jaw grip has been released, and
   a fixed arm mounted adjacent and extending closely alongside said movable jaw such that, when said movable jaw is in its pit gripping position, said fixed arm is remote from said aperture, and when said movable arm is in its pit releasing position, said fixed arm is alongside said aperture, whereby the relative movement between the stone removing arms and their respectively adjacent laws will serve to knock loose any pit engaging said jaws after the grip of the jaws has been released.

* * * * *